US010820045B2

(12) United States Patent
Tofigh et al.

(10) Patent No.: US 10,820,045 B2
(45) Date of Patent: Oct. 27, 2020

(54) METHOD AND SYSTEM FOR VIDEO STREAM PERSONALIZATION

(71) Applicant: AT&T Intellectual Property I, L.P., Atlanta, GA (US)

(72) Inventors: Mostafa Tofigh, Cupertino, CA (US); Kaveh Hushyar, Saratoga, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/667,379

(22) Filed: Aug. 2, 2017

(65) Prior Publication Data
US 2017/0332142 A1 Nov. 16, 2017

Related U.S. Application Data

(63) Continuation of application No. 14/823,176, filed on Aug. 11, 2015, now Pat. No. 9,754,353, which is a (Continued)

(51) Int. Cl.
*G06T 3/40* (2006.01)
*G06T 19/20* (2011.01)
(Continued)

(52) U.S. Cl.
CPC ... *H04N 21/440263* (2013.01); *G06F 16/743* (2019.01); *G06T 3/4092* (2013.01); *G06T 19/20* (2013.01); *H04N 7/17327* (2013.01); *H04N 21/2343* (2013.01); *H04N 21/2353* (2013.01); *H04N 21/234309* (2013.01); *H04N 21/234345* (2013.01); *H04N 21/234354* (2013.01); *H04N 21/234363* (2013.01); *H04N 21/2668* (2013.01);
(Continued)

(58) Field of Classification Search
CPC ............ H04N 5/4401; H04N 7/17318; H04N 21/235; H04H 60/27; H04H 60/13
See application file for complete search history.

(56) References Cited

U.S. PATENT DOCUMENTS 5,610,653 A 3/1997 Abecassis
5,708,845 A 1/1998 Wistendahl et al.
(Continued)

FOREIGN PATENT DOCUMENTS

WO 9926415 5/1999
WO 0169911 9/2001
WO 0237828 5/2002

OTHER PUBLICATIONS

International Application Serial No. PCT/US2008/059921, International Search Report dated Jun. 11, 2008, 6 pgs.
(Continued)

*Primary Examiner* — Anthony Bantamoi
(74) *Attorney, Agent, or Firm* — Guntin & Gust, PLC; Mark Wilinski

(57) ABSTRACT

A method and system for video stream personalization. A personalization policy may be accessed. The personalization policy may include an image identification and an image alteration to a video image identified by the image identification. At least one instance of the video image may be identified in a video stream. An output stream may be produced from the video stream in response to the personalization policy. The output stream may include the image alteration to the video image.

22 Claims, 11 Drawing Sheets

Related U.S. Application Data continuation of application No. 11/786,663, filed on Apr. 11, 2007, now Pat. No. 9,137,497.

(51) Int. Cl.
*G06F 16/74* (2019.01)
*H04N 21/2343* (2011.01)
*H04N 21/431* (2011.01)
*H04N 21/44* (2011.01)
*H04N 21/472* (2011.01)
*H04N 21/482* (2011.01)
*H04N 7/173* (2011.01)
*H04N 21/235* (2011.01)
*H04N 21/2668* (2011.01)
*H04N 21/435* (2011.01)
*H04N 21/45* (2011.01)
*H04N 21/462* (2011.01)
*H04N 21/4402* (2011.01)

(52) U.S. Cl.
CPC ....... *H04N 21/435* (2013.01); *H04N 21/4318* (2013.01); *H04N 21/44008* (2013.01); *H04N 21/440218* (2013.01); *H04N 21/4532* (2013.01); *H04N 21/462* (2013.01); *H04N 21/47202* (2013.01); *H04N 21/4828* (2013.01)

(56) References Cited

U.S. PATENT DOCUMENTS

| | | | |
|---|---|---|---|
| 5,757,417 A | 5/1998 | Aras | |
| 5,974,235 A | 10/1999 | Nunally | |
| 6,208,348 B1 | 3/2001 | Kaye | |
| 6,357,042 B2 | 3/2002 | Srinivasan | |
| 6,396,962 B1 | 5/2002 | Haffey | |
| 6,452,642 B1 | 9/2002 | Brett | |
| 6,491,585 B1 | 12/2002 | Miyamoto | |
| 6,937,730 B1 | 8/2005 | Buxton | |
| 6,954,498 B1 | 10/2005 | Lipton | |
| 6,970,181 B1 * | 11/2005 | Fadel | H04N 7/14 |
| 7,127,452 B1 * | 10/2006 | Yashiro | G06F 17/30 |
| | | | 707/3 |
| 7,334,249 B1 * | 2/2008 | Byers | H04N 7/10 |
| 8,213,774 B2 * | 1/2012 | Relan | H04N 5/93 |
| | | | 386/280 |
| 8,201,080 B2 * | 6/2012 | Byers | G06F 17/00 |
| | | | 715/230 |
| 2002/0105531 A1 | 8/2002 | Niemi | |
| 2002/0152233 A1 | 10/2002 | Cheong | |
| 2002/0164149 A1 | 11/2002 | Wilkinson | |
| 2002/0196850 A1 * | 12/2002 | Liu | H04N 7/025 |
| 2003/0065807 A1 * | 4/2003 | Satomi | G06F 15/16 |
| 2003/0159153 A1 | 8/2003 | Falvo | |
| 2004/0031062 A1 | 2/2004 | Lemmons et al. | |
| 2004/0247173 A1 | 12/2004 | Nielsen | |
| 2005/0028191 A1 | 2/2005 | Sullivan | |
| 2005/0062888 A1 * | 3/2005 | Wood | H04N 11/00 |
| | | | 348/553 |
| 2005/0259147 A1 | 11/2005 | Nam et al. | |
| 2006/0072838 A1 | 4/2006 | Chui | |
| 2006/0215753 A1 | 9/2006 | Lee | |
| 2006/0259588 A1 | 11/2006 | Lerman | |
| 2007/0226761 A1 * | 9/2007 | Zalewski | H04N 7/025 |
| 2007/0250896 A1 * | 10/2007 | Scanion | H04N 7/16 |
| 2008/0012988 A1 | 1/2008 | Baharav | |
| 2008/0122835 A1 | 5/2008 | Falco, Jr. | |
| 2008/0232680 A1 | 9/2008 | Berestov et al. | |

OTHER PUBLICATIONS

International Application Serial No. PCT/US2008/059921, Written Opinion dated Jun. 11, 2008, 11 pgs.

* cited by examiner

METHOD AND SYSTEM FOR VIDEO STREAM PERSONALIZATION

CROSS-REFERENCE TO RELATED APPLICATIONS

This application is a continuation of and claims priority to U.S. application Ser. No. 14/823,176, filed Aug. 11, 2015, which is a continuation of and claims priority to U.S. application Ser. No. 11/786,663, filed Apr. 11, 2007 (now U.S. Pat. No. 9,137,497), which are incorporated herein by reference in their entirety.

FIELD OF THE DISCLOSURE

This application relates to a method and system for communication, and more specifically to systems and methods for providing video stream personalization.

BACKGROUND

A video client may receive a video stream from a number of available video streams based on a selection of a user of desired content. The selected video stream is then provided to the video client, which upon receipt may display the associated content or provide the content to another device for display.

A user is generally limited to viewing a selected video stream as provided. The user cannot customize the video stream based upon a personal interest, but may only obtain a different selection of an available video stream from a provider.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

Example methods and systems for video stream personalization are described. In the following description, for purposes of explanation, numerous specific details are set forth in order to provide a thorough understanding of example embodiments. It will be evident, however, to one skilled in the art that the present invention may be practiced without these specific details.

In an example embodiment, a personalization policy may be accessed. The personalization policy may include an image identification and an image alteration to a video image identified by the image identification. At least one instance of the video image may be identified in a video stream. An output stream may be produced from the video stream in response to the personalization policy. The output stream may include the image alteration to the video image.

In an example embodiment, an image identification for a video image in a video stream may be selected. An image alteration may be associated with the video image. A personalization policy may be written for the video image. The personalization policy may have the image identification and an image alteration to the video image represented by the image identification.

In an example embodiment, a first request to alter an appearance of a video image within an output stream may be received. A second request including an image identification of the video image and an image alternation to the video image to a network resource may be provided. A modified output stream may be received according to a modified personalization policy.

Figure 1:
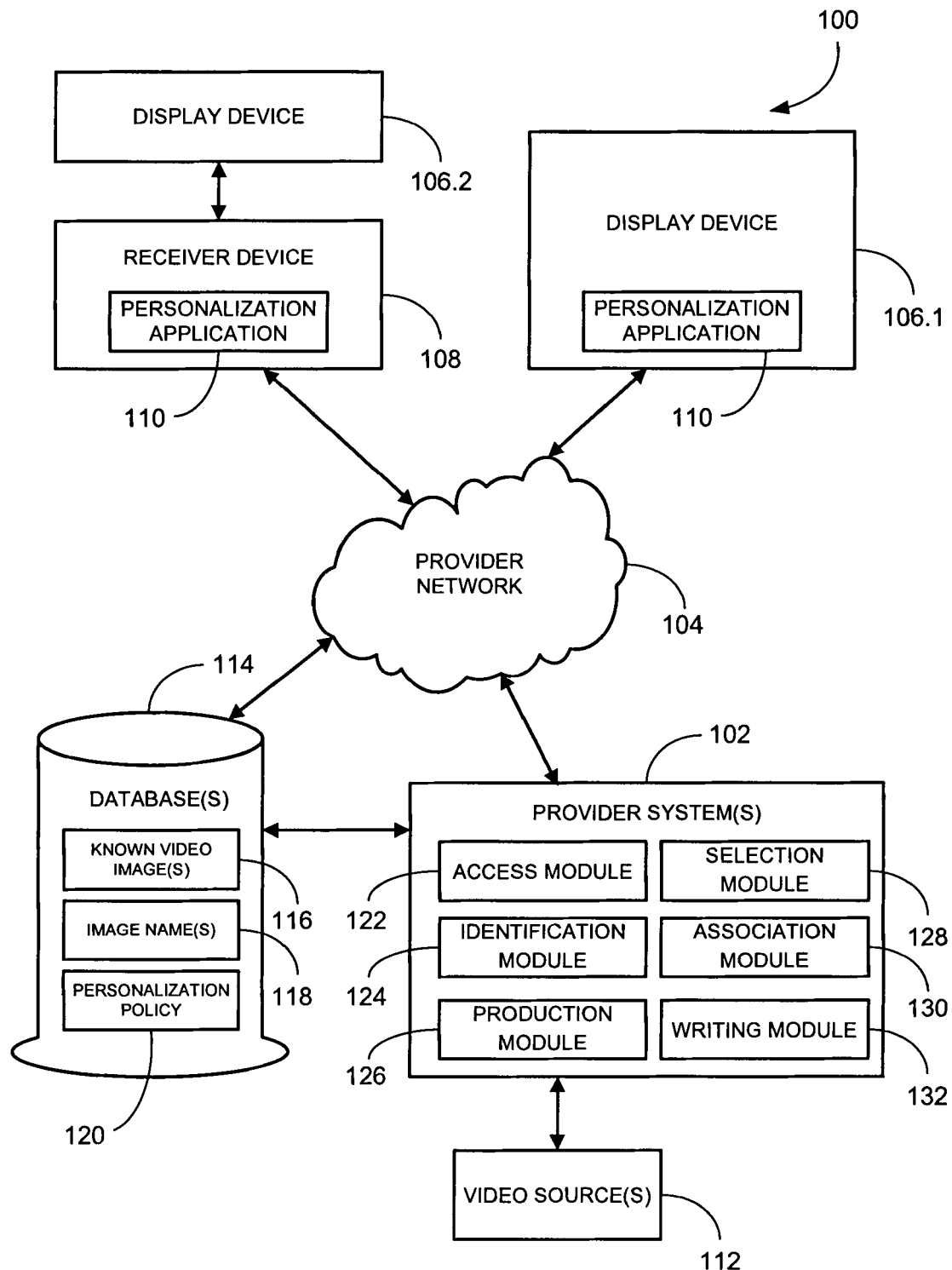
FIG. 1 is an example video system.

FIG. 1 illustrates an example video stream system 100. The video stream system 100 includes a provider system 104 that may receive one or more video streams from one or more video sources 112. In accordance with video content of a selected video stream, the provider system 104 may provide an output stream over a provider network 104 to a display device 106.1 and/or to a display device 106.2 through a receiver device 108.

The video stream may be a high quality video stream (e.g., MPEG-4) that is transcoded for distribution to the display device 106.1 and/or the receiver device 108. The video stream may include video content (e.g., in the form of frames) and optionally audio content of a variety of types including television programs, movies, commercials, and the like.

The provider network 104 may be a Global System for Mobile Communications (GSM) network, an Internet Protocol (IP) network, a Wireless Application Protocol (WAP) network, and/or a Wifi network. Other networks may also be used.

A personalization application 110 may be embodied within the display device 106.1 and/or the receiver device 108 to enable personalization of an output stream as described in greater detail below. Examples of the receiver device 108 include a set-top box, a receiver card, a mobile phone, and a computing system; however other devices may also be used.

The provider system 102 may include an access module 122, an identification module 124, and a production module 126 to personalize an output stream and/or a selection module 128, an association module 130, and a writing module 132 to write a personalization policy 120 in a video image database 114.

The access module 122 accesses the personalization policy 120, while the identification module 124 identifies at least one instance of the video image in a video stream. The production module 126 thereafter produces an output stream from the video stream in response to the applicable personalization policy 120.

The selection module 128 selects an image identification for a video image in a video stream, while the association module 130 associates an image alteration with the video image. The writing module 132 thereafter writes a personalization policy 120 for the video image, thereby enabling future presentations of the video streams that include applicable video images referenced in the personalization policy 120 to include the image alteration.

The provider system 102 may communicate with the video image database 114 directly and/or over a provider network 104. The video image database 114 may include identification of known video images 116, image names 118 for the known video images, and the personalization policy 120.

The personalization policy 120 may be used to personalize an output stream from the provider system 102 to the display device 106.1 and/or the receiver device 108 as described in greater detail below. The personalization of the stream may enable dynamic changing of the video stream in response to the personalization policy 120 that may enhance a viewing experience by a particular user.

In an example embodiment, the personalization policy 120 may be a security policy that defines an authorization of a user to view the video stream. A plurality of personalization policies 120 may optionally be available in the video image database 114 for a plurality of associated users.

Figure 2:
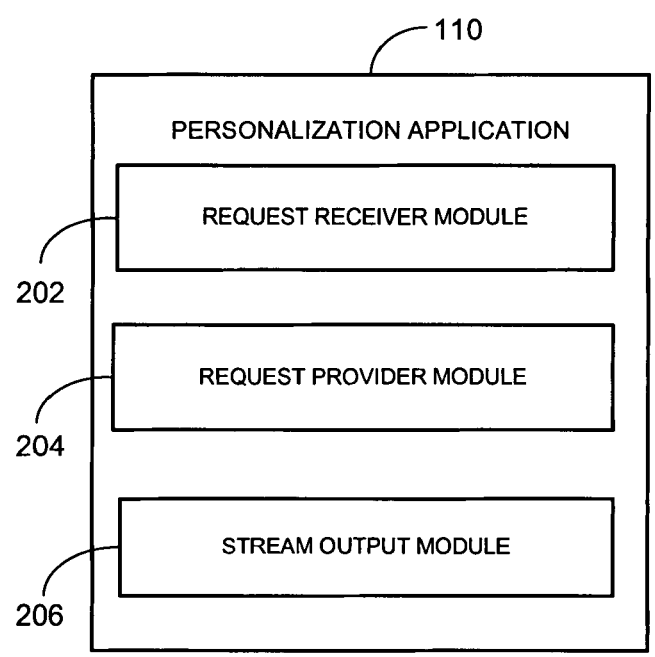
FIG. 2 is an example personalization application.

FIG. 2 illustrates an example personalization application 110 (see FIG. 1) that may deployed in the video stream system 100. However, the personalization application 110 may also be deployed in other systems.

The personalization application 110 may include a request receiver module 202, a request provider module 204, and/or a stream output module 206. Other modules may also be used.

The request receiver module 202 receives a first request to alter appearance of a video image within an output stream. For example, a user may communicate with the request receiver module 202 through a user interface to request the image alteration.

The request provider module 204 provides a second request including an image identification of the video image and an image alternation to the video image to a network resource (e.g., the provider system 102).

The stream output module 206 receives a modified output stream from the provider system 102 in response to a modified personalization policy 120 (see FIG. 1).

Figure 3:
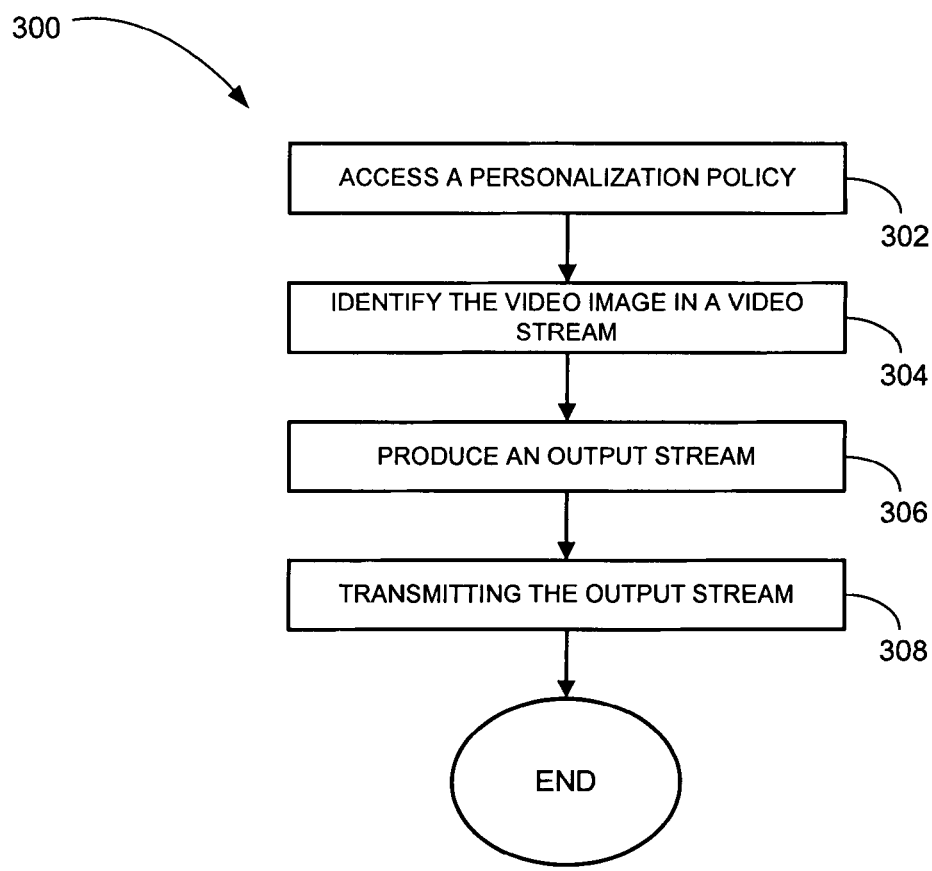
FIG. 3 is a flowchart illustrating a method for video stream personalization in accordance with an example embodiment.

FIG. 3 illustrates a method 300 for video stream personalization according to an example embodiment. The method 300 may be used by the provider system 102 (see FIG. 1) to personalize a video stream for the display device 106.1 and/or the receiver device 108, but may also be used to personalize a video stream in other systems.

A personalization policy may be accessed at block 302. The personalization policy may include an image identification and an image alteration (e.g., a dynamic or defined image alteration) to a video image identified by the image identification. The video image may be a portion of a frame of the video stream for which image alteration is sought and the portion of the frame may be identified by the image identification. For example, the image identification may optionally identify a video image from the known video images 116.

The image alteration to the video stream may include, by way of example, a zoom in view of a video image in the output stream, an enhanced resolution (e.g., more bits and/or less compression) of the video image, a replacement image (e.g., a bloody face with a non-bloody face) of the video image, a selection of an image in the output stream as a new video image, a deselection of the video image in the output stream, or the like. The image alteration may have the effect of removing a video image from the video stream or adding a video image to the video stream. Other image alterations may also be performed.

At least one instance of the video image may be identified in a video stream at block 304. For example, the image identification may be accessed from the video image database 114 (e.g., from the personalization policy 120) and at least one instance of the video image in the video stream matching with the image identification may be selected. The video image may, in an example embodiment, be identified during the operations at block 304 by matching an image name in metadata of the video stream with a name of the image identification.

An output stream including the image alteration to the video image may be produced from the video stream according to the personalization policy 120 at block 306. The image alteration may partially or completely overlay the video image in the output stream, be in a selected location of one or more frames within the output stream (e.g., in a corner of a display device 106.1, 106.2 when presented), or otherwise be present within the output stream. The image alteration may smoothly be integrated into the output stream or may be noticeable to a user (e.g., as a pop-up presentation).

In an example embodiment, a three-dimensional image of the video image may be produced and an output stream may be produced from the video stream for the user according to the personalization policy 120 during the operations at block 306. The output stream may then include the three-dimensional image of the video image as the image alteration (e.g., as the video stream was in a two-dimensional format).

The output stream may be transmitted to a requestor (e.g., a device incorporating the personalization application 110) at block 308. For example, the output stream may be provided over the provider network 104 via a unicast and/or a multicast protocol, however other protocols may also be used.

By way of an example, a personalization policy 120 for a wedding video may define the faces of the bride and groom for image identification. The faces of the bride and groom may then be identified in the video stream and the output stream produced from the video stream may be altered in accordance with the personalization policy 120. For example, zoomed in images of the faces may appear in an obtrusive portion in frames of the output stream, the faces may appear at a higher quality in the output stream, and the like.

Figure 4:
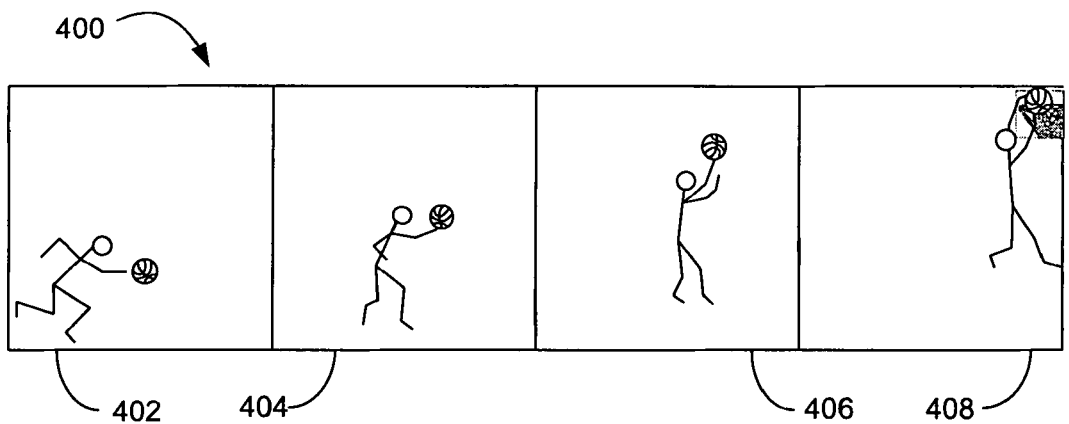
FIGS. 4-7 are block diagrams of frames of a video stream according to an example embodiment.
Figure 5:
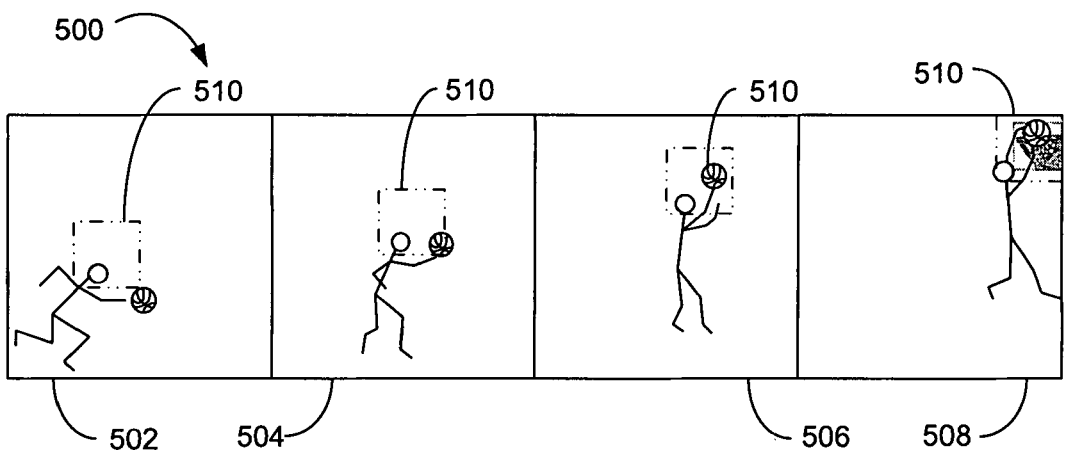

FIGS. 4-7 are block diagrams of frames of a video stream according to an example embodiment. The frames 400 of FIG. 4 show a person engaging in a sports activity over a first frame 402, a second frame 404, a third frame 406, and a fourth frame 408. The frames 500 of FIG. 5 show an image identification 510 of a video image over a first frame 502, a second frame 504, a third frame 506, and a fourth frame 508.

Figure 6:
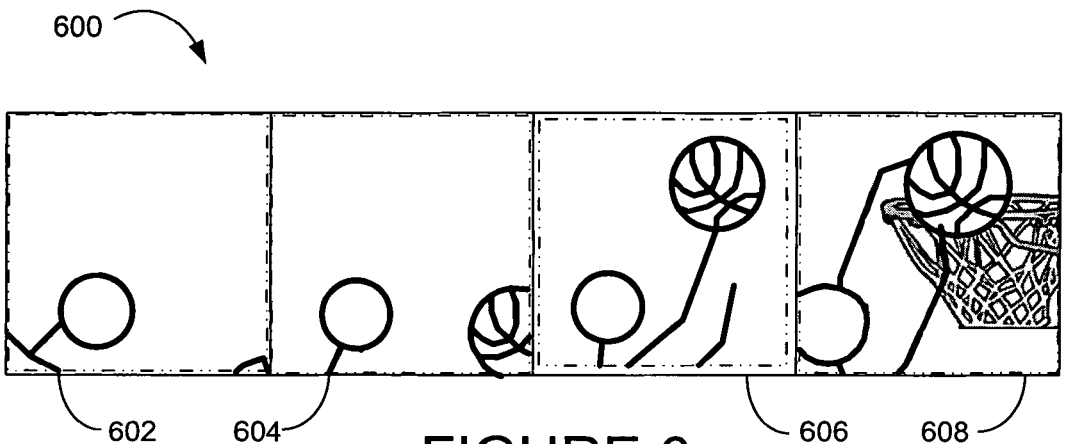
Figure 7:
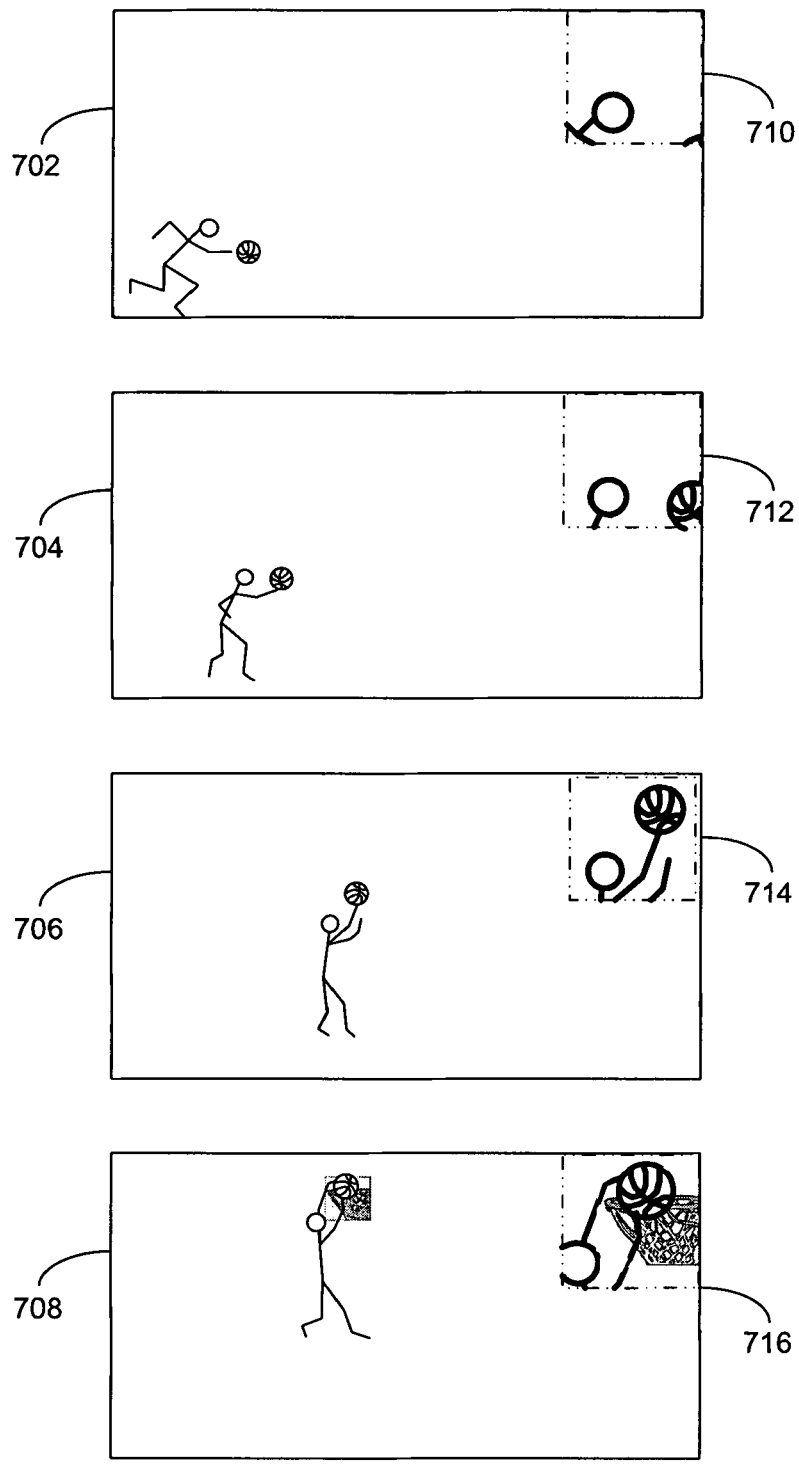

The frames 600 of FIG. 6 and the frames 700 of the FIG. 7 show an example embodiment of a zoom in view of the frames 500 according to the image identification 510. The video image over a first frame 602, a second frame 604, a third frame 606, and a fourth frame 608 is shown to overlay an entire frame, while the video image over a first frame 702, a second frame 704, a third frame 706, and a fourth frame 708 is shown to overlay a partial frame. Other zoom in views and/or other enhancements may also be made to the frames 500 based on the image identification 510.

Figure 8:
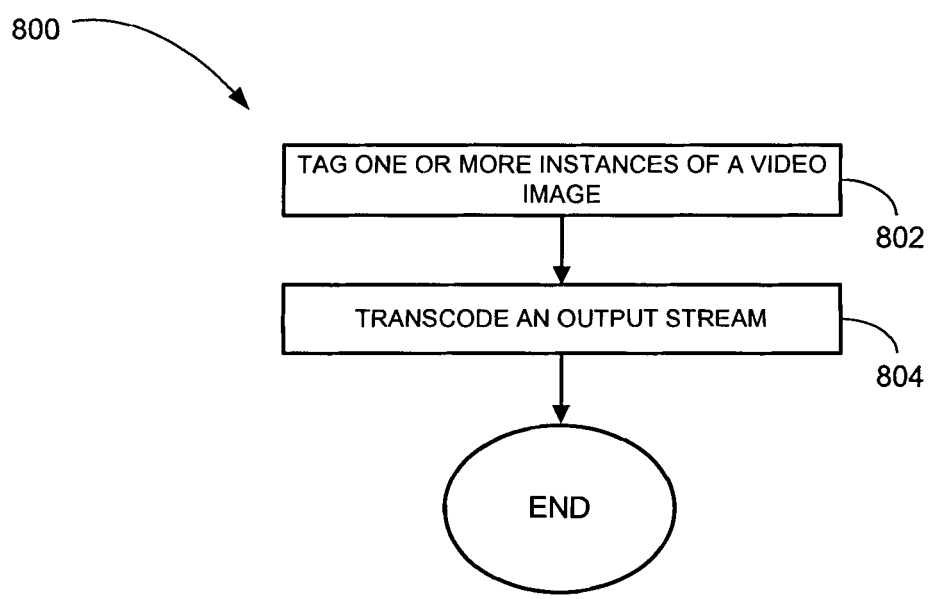
FIG. 8 is a flowchart illustrating a method for producing an output stream in accordance with an example embodiment.

FIG. 8 illustrates a method 800 for producing an output stream according to an example embodiment. In an example embodiment, the method 800 may be performed at block 306 (see FIG. 3).

At least one instance of the video image in the video stream may be tagged at block 802.

An output stream may be transcoded from the tagged video stream for the user according to the personalization policy 120 (see FIG. 1) and the one or more tagged instances at block 804. The output stream may include metadata that includes the image alteration to the video image at the one or more tagged instances. For example, the video stream may be transcoded for display by the receiver device 108 and/or the display device 106.1.

Figure 9:
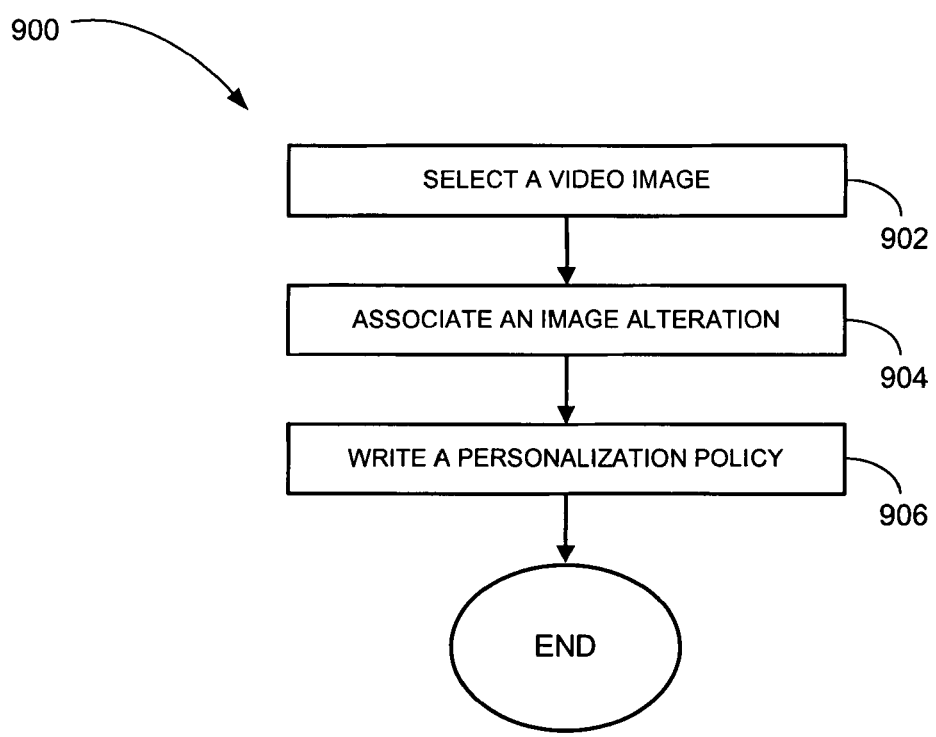
FIG. 9 is a flowchart illustrating a method for creating a personalization policy in accordance with an example embodiment.

FIG. 9 illustrates a method 900 for creating a personalization policy 120 (see FIG. 1) according to an example embodiment. In an example embodiment, the method 300 may be performed by the provider system 102 (see FIG. 1).

An image identification for a video image in a video stream may be selected at block 902.

An image alteration may be associated with the video image at block 904. For example, a defined image alteration may be received from a user and the defined image alteration may be associated with the video image. An association of the defined image alteration with the image identification may optionally be stored in the video image database 114 (see FIG. 1). In an example embodiment, an image alteration may optionally be dynamically associated with the video image from an association stored in the video image database 114 at block 904.

A personalization policy 120 may be written for the video image at block 906. The personalization policy 120 may include the image identification (e.g., from the known video images 116) and an image alteration to a video image identified by the image identification.

Figure 10:
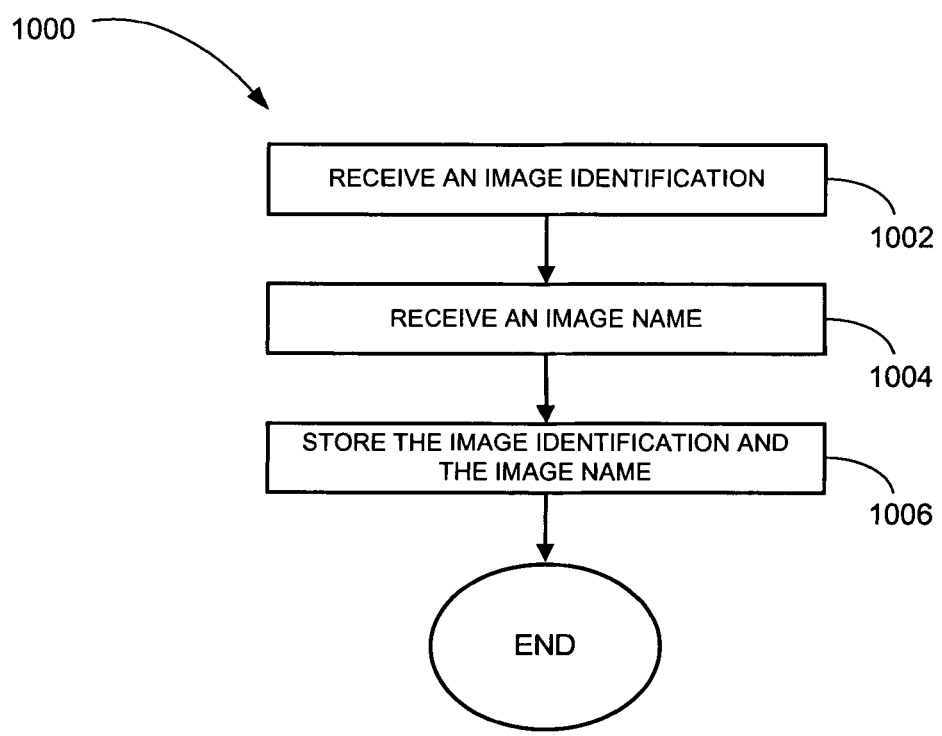
FIG. 10 is a flowchart illustrating a method for selecting a video image in accordance with an example embodiment.

FIG. 10 illustrates a method 1000 for selecting a video image according to an example embodiment. In an example embodiment, the method 1000 may be performed at block 902 (see FIG. 9).

An image identification of a video image in a video stream may be received from a user at block 1002. An image name of the image identification may optionally be received from a user at block 1004. In an example embodiment, storing the image name of the video image identification may enable recognition of the video image in a video stream by both image comparison and a textual comparison to available metadata with the video stream that identifies video images.

The image identification of the video image and/or the image name may be stored in the video image database 114 at block 1006.

Figure 11:
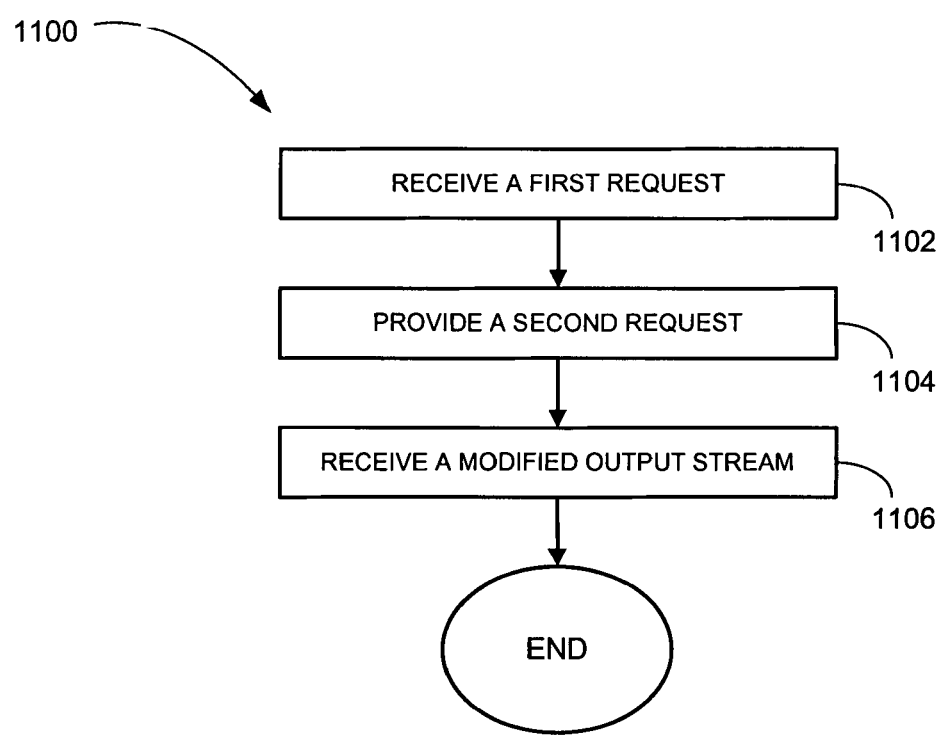
FIG. 11 is a flowchart illustrating a method for personalizing an output stream in accordance with an example embodiment.

FIG. 11 illustrates a method 1100 for personalizing an output stream according to an example embodiment. In an example embodiment, the method 1100 may be performed by the personalization application 110 (see FIG. 1).

A first request to alter appearance of a video image with an output stream may be received at block 1102. The first request may include an image identification of a video image and a selection of an image alteration to the video image. For example, the first request may be received from a user defining a video image that the user would like to alter in the output stream.

A second request including an image identification of the video image and an image alternation to the video image may be provided to a network resource (e.g., the provider system 102) at block 1104. A modified output stream in response to a modified personalization policy 120 may then be received at block 1106.

Figure 12:
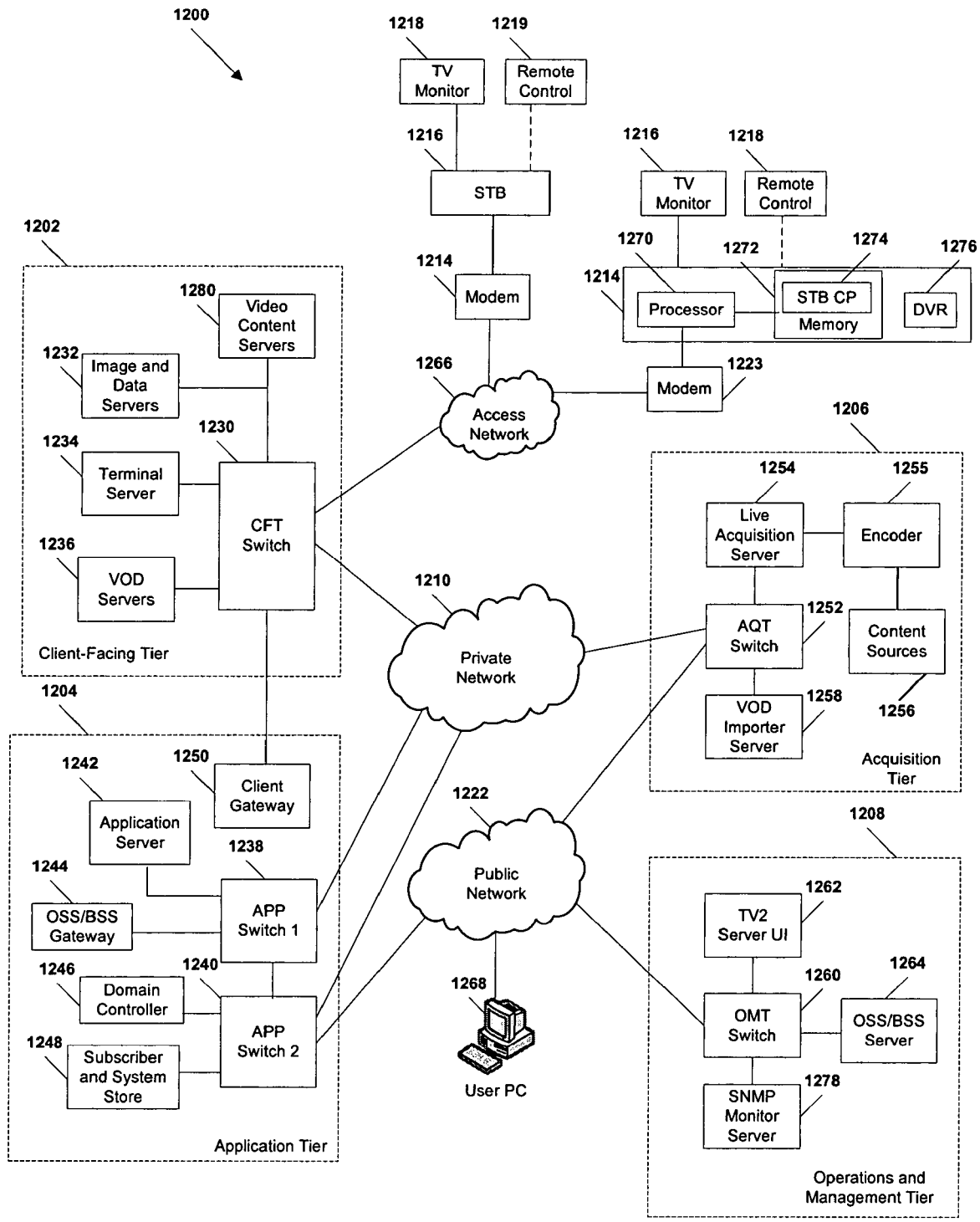
FIG. 12 is a block diagram of an IPTV system in accordance with an example embodiment.

FIG. 12 illustrates an example embodiment of an Internet Protocol Television (IPTV) system 1200 in which the video stream system 100 (see FIG. 1) may be deployed and/or the methods 300, 800-1100 (see FIGS. 3 and 8-11). However, the video stream system 100 may be deployed in other types of IPTV and non-IPTV video streams, and the methods 300, 800-1100 may be used in other systems.

The system 1200 as illustrated may include a client facing tier 1202, an application tier 1204, an acquisition tier 1206, and an operations and management tier 1208. Each tier 1202, 1204, 1206, 1208 is coupled to a private network 1210; to a public network 1222, such as the Internet; or to both the private network 1210 and the public network 1222. For example, the client-facing tier 1202 may be coupled to the private network 1210. Further, the application tier 1204 may be coupled to the private network 1210 and to the public network 1222. The acquisition tier 1206 may also be coupled to the private network 1210 and to the public network 1222. Additionally, the operations and management tier 1208 may be coupled to the public network 1222.

As illustrated in FIG. 12, the various tiers 1202, 1204, 1206, 1208 communicate with each other via the private network 1210 and the public network 1222. For instance, the client-facing tier 1202 may communicate with the application tier 1204 and the acquisition tier 1206 via the private network 1210. The application tier 1204 may also communicate with the acquisition tier 1206 via the private network 1210. Further, the application tier 1204 may communicate with the acquisition tier 1206 and the operations and management tier 1208 via the public network 1222. Moreover, the acquisition tier 1206 may communicate with the operations and management tier 1208 via the public network 1222. In a particular embodiment, elements of the application tier 1204, including, but not limited to, a client gateway 1250, may communicate directly with the client-facing tier 1202.

As illustrated in FIG. 12, the client-facing tier 1202 may communicate with user equipment via a private access network 1266, such as an Internet Protocol Television (IPTV) access network. In an illustrative embodiment, modems, such as a first modem 1214 and a second modem 1213 may be coupled to the private access network 1266. The client-facing tier 1202 may communicate with a first representative set-top box device 1216 via the first modem 1214 and with a second representative set-top box device 1214 via the second modem 1212. The client-facing tier 1202 may communicate with a large number of set-top boxes, such as the representative set-top boxes 1216, 1214, over a wide geographic area, such as a regional area, a metropolitan area, a viewing area, a designated market area or any other suitable geographic area, market area, or subscriber or customer group that may be supported by networking the client-facing tier 1202 to numerous set-top box devices. In an illustrative embodiment, the client-facing tier, or any portion thereof, may be included at a video head-end office.

In a particular embodiment, the client-facing tier 1202 may be coupled to the modems 1214, 1213 via fiber optic cables. Alternatively, the modems 1214 and 1213 may be digital subscriber line (DSL) modems that are coupled to one or more network nodes via twisted pairs, and the client-facing tier 1202 may be coupled to the network nodes via fiber-optic cables. Each set-top box device 1216, 1214 may process data received via the private access network 1266, via an IPTV software platform, such as Microsoft® TV IPTV Edition. In another embodiment, representative set-top boxes 1216, 1214 may receive data from private access network 1266 through RF and other cable and/or satellite based networks.

Additionally, the first set-top box device 1216 may be coupled to a first external display device, such as a first television monitor 1218, and the second set-top box device 1214 may be coupled to a second external display device, such as a second television monitor 1216. Moreover, the first set-top box device 1216 may communicate with a first remote control 1219, and the second set-top box device may communicate with a second remote control 1218.

In an example, non-limiting embodiment, each set-top box device 1216, 1214 may receive video content, which may include video and audio portions, from the client-facing tier 1202 via the private access network 1266. The set-top boxes 1216, 1214 may transmit the video content to an external display device, such as the television monitors 1218, 1216. Further, the set-top box devices 1216, 1214 may each include a STB processor, such as STB processor 1270, and a STB memory device, such as STB memory 1272, which is accessible to the STB processor 1270. In one embodiment, a computer program, such as the STB computer program 1274, may be embedded within the STB memory device 1272. Each set-top box device 1216, 1214 may also include a video content storage module, such as a digital video recorder (DVR) 1276. In a particular embodiment, the set-top box devices 1216, 1214 may communicate commands received from the remote control devices 1219, 1218 to the client-facing tier 1202 via the private access network 1266.

In an illustrative embodiment, the client-facing tier 1202 may include a client-facing tier (CFT) switch 1230 that manages communication between the client-facing tier 1202 and the private access network 1266 and between the client-facing tier 1202 and the private network 1210. As shown, the CFT switch 1230 is coupled to one or more image and data servers 1232 that store still images associated with programs of various IPTV channels. The image and data servers 1232 may also store data related to various channels, e.g., types of data related to the channels and to programs or video content displayed via the channels. In an illustrative embodiment, the image and data servers 1232 may be a cluster of servers, each of which may store still images, channel and program-related data, or any combination thereof. The CFT switch 1230 may also be coupled to a terminal server 1234 that provides terminal devices with a connection point to the private network 1210. In a particular embodiment, the CFT switch 1230 may also be coupled to one or more video-on-demand (VOD) servers 1236 that store or provide VOD content imported by the IPTV system 1200. In an illustrative, non-limiting embodiment, the VOD content servers 1280 may include one or more unicast servers.

The client-facing tier 1202 may also include one or more video content servers 1280 that transmit video content requested by viewers via their set-top boxes 1216, 1214. In an illustrative, non-limiting embodiment, the video content servers 1280 may include one or more multicast servers.

As illustrated in FIG. 12, the application tier 1204 may communicate with both the private network 1210 and the public network 1222. The application tier 1204 may include a first application tier (APP) switch 1238 and a second APP switch 1240. In a particular embodiment, the first APP switch 1238 may be coupled to the second APP switch 1240. The first APP switch 1238 may be coupled to an application server 1242 and to an OSS/BSS gateway 1244. In a particular embodiment, the application server 1242 may provide applications to the set-top box devices 1216, 1214 via the private access network 1266, which enable the set-top box devices 1216, 1214 to provide functions, such as display, messaging, processing of IPTV data and VOD material, etc. In a particular embodiment, the OSS/BSS gateway 1244 includes operation systems and support (OSS) data, as well as billing systems and support (BSS) data. In one embodiment, the OSS/BSS gateway may provide or restrict access to an OSS/BSS server 1264 that stores operations and billing systems data.

Further, the second APP switch 1240 may be coupled to a domain controller 1246 that provides web access, for example, to users via the public network 1222. For example, the domain controller 1246 may provide remote web access to IPTV account information via the public network 1222, which users may access using their personal computers 1268. The second APP switch 1240 may be coupled to a subscriber and system store 1248 that includes account information, such as account information that is associated with users who access the system 1200 via the private network 1210 or the public network 1222. In a particular embodiment, the application tier 1204 may also include a client gateway 1250 that communicates data directly with the client-facing tier 1202. In this embodiment, the client gateway 1250 may be coupled directly to the CFT switch 1230. The client gateway 1250 may provide user access to the private network 1210 and the tiers coupled thereto.

In a particular embodiment, the set-top box devices 1216, 1214 may access the IPTV system 1200 via the private access network 1266, using information received from the client gateway 1250. In this embodiment, the private access network 1266 may provide security for the private network 1210. User devices may access the client gateway 1250 via the private access network 1266, and the client gateway 1250 may allow such devices to access the private network 1210 once the devices are authenticated or verified. Similarly, the client gateway 1250 may prevent unauthorized devices, such as hacker computers or stolen set-top box devices from accessing the private network 1210, by denying access to these devices beyond the private access network 1266.

For example, when the first representative set-top box device 1216 accesses the system 1200 via the private access network 1266, the client gateway 1250 may verify subscriber information by communicating with the subscriber and system store 1248 via the private network 1210, the first APP switch 1238, and the second APP switch 1240. Further, the client gateway 1250 may verify billing information and status by communicating with the OSS/BSS gateway 1244 via the private network 1210 and the first APP switch 1238. In one embodiment, the OSS/BSS gateway 1244 may transmit a query across the first APP switch 1238, to the second APP switch 1240, and the second APP switch 1240 may communicate the query across the public network 1222 to the OSS/BSS server 1264. After the client gateway 1250 confirms subscriber and/or billing information, the client gateway 1250 may allow the set-top box device 1216 access to IPTV content and VOD content. If the client gateway 1250 is unable to verify subscriber information for the set-top box device 1216, e.g., because it is connected to an unauthorized twisted pair, the client gateway 1250 may block transmissions to and from the set-top box device 1216 beyond the private access network 1266.

As indicated in FIG. 12, the acquisition tier 1206 includes an acquisition tier (AQT) switch 1252 that communicates with the private network 1210. The AQT switch 1252 may also communicate with the operations and management tier

1208 via the public network 1222. In a particular embodiment, the AQT switch 1252 may be coupled to a live acquisition server 1254 that receives television or movie content, for example, from content sources 1256 through an encoder 1255. In a particular embodiment during operation of the IPTV system, the live acquisition server 1254 may acquire television or movie content. The live acquisition server 1254 may transmit the television or movie content to the AQT switch 1252 and the AQT switch 1252 may transmit the television or movie content to the CFT switch 1230 via the private network 1210.

Further, the television or movie content may be transmitted to the video content servers 1280, where it may be encoded, formatted, stored, or otherwise manipulated and prepared for communication to the set-top box devices 1216, 1214. The CFT switch 1230 may communicate the television or movie content to the modems 1214, 1213 via the private access network 1266. The set-top box devices 1216, 1214 may receive the television or movie content via the modems 1214, 1213, and may transmit the television or movie content to the television monitors 1218, 1216. In an illustrative embodiment, video or audio portions of the television or movie content may be streamed to the set-top box devices 1216, 1214.

Further, the AQT switch may be coupled to a video-on-demand importer server 1258 that stores television or movie content received at the acquisition tier 1206 and communicates the stored content to the VOD server 1236 at the client-facing tier 1202 via the private network 1210. Additionally, at the acquisition tier 1206, the video-on-demand (VOD) importer server 1258 may receive content from one or more VOD sources outside the IPTV system 1200, such as movie studios and programmers of non-live content. The VOD importer server 1258 may transmit the VOD content to the AQT switch 1252, and the AQT switch 1252, in turn, may communicate the material to the CFT switch 1230 via the private network 1210. The VOD content may be stored at one or more servers, such as the VOD server 1236.

When user issue requests for VOD content via the set-top box devices 1216, 1214, the requests may be transmitted over the private access network 1266 to the VOD server 1236, via the CFT switch 1230. Upon receiving such requests, the VOD server 1236 may retrieve the requested VOD content and transmit the content to the set-top box devices 1216, 1214 across the private access network 1266, via the CFT switch 1230. The set-top box devices 1216, 1214 may transmit the VOD content to the television monitors 1218, 1216. In an illustrative embodiment, video or audio portions of VOD content may be streamed to the set-top box devices 1216, 1214.

FIG. 12 further illustrates that the operations and management tier 1208 may include an operations and management tier (OMT) switch 1260 that conducts communication between the operations and management tier 1208 and the public network 1222. In the embodiment illustrated by FIG. 1, the OMT switch 1260 is coupled to a TV2 server 1262. Additionally, the OMT switch 1260 may be coupled to an OSS/BSS server 1264 and to a simple network management protocol (SNMP) monitor 1270 that monitors network devices within or coupled to the IPTV system 1200. In a particular embodiment, the OMT switch 1260 may communicate with the AQT switch 1252 via the public network 1222.

In an illustrative embodiment, the live acquisition server 1254 may transmit the television or movie content to the AQT switch 1252, and the AQT switch 1252, in turn, may transmit the television or movie content to the OMT switch 1260 via the public network 1222. In this embodiment, the OMT switch 1260 may transmit the television or movie content to the TV2 server 1262 for display to users accessing the user interface at the TV2 server 1262. For example, a user may access the TV2 server 1262 using a personal computer (PC) 1268 coupled to the public network 1222.

Figure 13:
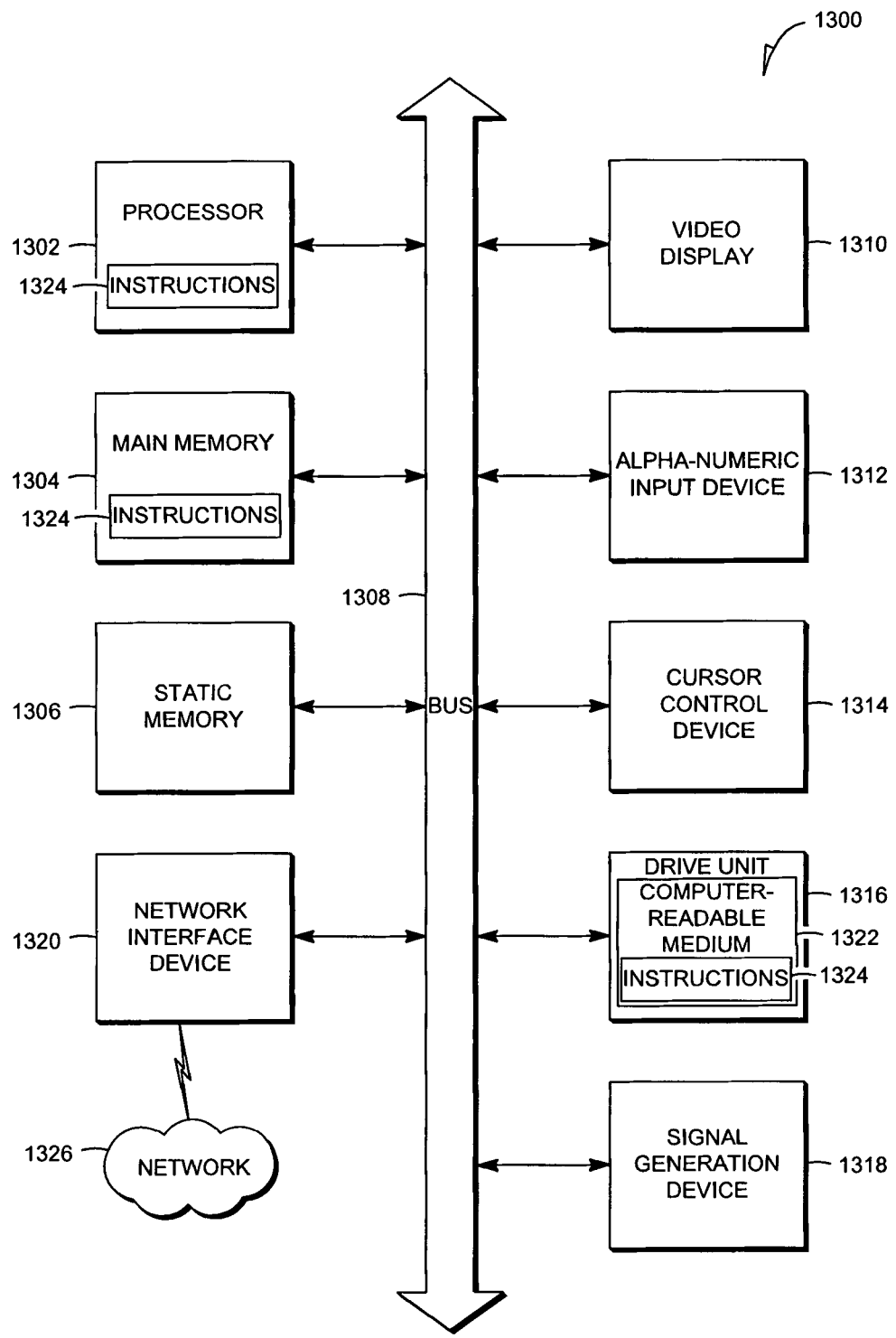
FIG. 13 illustrates a diagrammatic representation of machine in the example form of a computer system within which a set of instructions for causing the machine to perform any one or more of the methodologies discussed herein may be executed.

FIG. 13 shows a diagrammatic representation of machine in the example form of a computer system 1300 within which a set of instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1300 includes a processor 1302 (e.g., a central processing unit (CPU), a graphics processing unit (GPU) or both), a main memory 1304 and a static memory 1306, which communicate with each other via a bus 1308. The computer system 1300 may further include a video display unit 1310 (e.g., a liquid crystal display (LCD) or a cathode ray tube (CRT)). The computer system 1300 also includes an alphanumeric input device 1312 (e.g., a keyboard), a user interface (UI) navigation device 1314 (e.g., a mouse), a disk drive unit 1316, a signal generation device 1318 (e.g., a speaker) and a network interface device 1320.

The disk drive unit 1316 includes a machine-readable medium 1322 on which is stored one or more sets of instructions and data structures (e.g., software 1324) embodying or utilized by any one or more of the methodologies or functions described herein. The software 1324 may also reside, completely or at least partially, within the main memory 1304 and/or within the processor 1302 during execution thereof by the computer system 1300, the main memory 1304 and the processor 1302 also constituting machine-readable media.

The software 1324 may further be transmitted or received over a network 1250 via the network interface device 1320 utilizing any one of a number of well-known transfer protocols (e.g., HTTP).

While the machine-readable medium 1322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories and optical and magnetic media.

Although an embodiment of the present invention has been described with reference to specific example embodiments, various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device comprising:
a processing system including a processor; and
a memory that stores executable instructions that, when executed by the processing system, facilitate performance of operations, the operations comprising:
receiving a video stream comprising a plurality of frames;
identifying a video image in the video stream responsive to receiving a selection of the video image during a presentation of the video stream, wherein the identifying is based on matching an image name in a metadata of the video stream with a name of an image identification accessed from a database, and wherein the image identification identifies a portion of a frame included in the plurality of frames of the video stream;
associating the image identification and an image alteration with the video image to generate a personalization policy, the associating being responsive to detecting user input indicating the image alteration;
generating a plurality of altered images of additional images based on the personalization policy, wherein the plurality of altered images comprises a zoomed-in image of a part of the video image; and
producing an adjusted video stream, the adjusted video stream including the plurality of altered images overlaying a portion of the video image, wherein a first position of content included in the video image of the video stream is shifted so as to be located at a second position in the video image of the adjusted video stream, and wherein the second position is different from the first position.

2. The device of claim 1, wherein the plurality of altered images is generated during the receiving of the video stream.

3. The device of claim 1, wherein the plurality of altered images overlays the video image at a selected location.

4. The device of claim 1, wherein the operations further comprise enhancing a resolution of the plurality of altered images.

5. The device of claim 1, wherein the database includes a video image database, and wherein the identifying of the video image comprises:
accessing the image identification from the video image database; and
matching the video image with the image identification.

6. The device of claim 1, wherein the identifying of the video image comprises matching an image name in metadata of the video stream with a name of the video image.

7. The device of claim 1, wherein the producing of the adjusted video stream further comprises transcoding the adjusted video stream.

8. The device of claim 1, wherein the producing of the adjusted video stream further comprises tagging the video image in the video stream as a tagged instance.

9. The device of claim 8, wherein the producing of the adjusted video stream further comprises transcoding the adjusted video stream, and wherein the adjusted video stream comprises second metadata including the image alteration to the video image at the tagged instance in the adjusted video stream.

10. The device of claim 1, wherein the video image comprises a face.

11. The device of claim 10, wherein the image alteration comprises a zoomed-in image of the face that provides an enhanced resolution of the face.

12. The device of claim 11, wherein the plurality of frames comprises a first plurality of frames, and wherein a respective altered image included in the plurality of altered images overlays an entirety of each frame of the first plurality of frames.

13. A non-transitory machine-readable storage medium comprising executable instructions that, when executed by a processing system including a processor, facilitate performance of operations, the operations comprising:
receiving a video stream;
identifying a video image in the video stream responsive to receiving a selection of the video image during a presentation of the video stream, wherein the identifying is based on matching an image name in metadata of the video stream with a name of an image identification accessed from a database, and wherein the image identification identifies a portion of a frame included in a plurality of frames of the video stream;

associating the image identification and an image alteration with the video image to generate a personalization policy, the associating being responsive to detecting user input indicating the image alteration;

generating a plurality of altered images of additional images based on the personalization policy, wherein the plurality of altered images comprises a zoomed-in image of a part of the video image; and producing an adjusted video stream, the adjusted video stream including the plurality of altered images overlaying a selected location of the video image in the video stream, wherein a first position of content included in the video image of the video stream is shifted so as to be located at a second position in the video image of the adjusted video stream, and wherein the second position is different from the first position.

14. The non-transitory machine-readable storage medium of claim 13, wherein the database includes a video image database, and wherein the identifying of the video image comprises:

accessing the image identification of the video image from the video image database; and matching the video image with the image identification.

15. The non-transitory machine-readable storage medium of claim 13, wherein the identifying of the video image comprises matching an image name in metadata of the video stream with a name of the video image.

16. The non-transitory machine-readable storage medium of claim 13, wherein the producing of the adjusted video stream further comprises transcoding the adjusted video stream.

17. The non-transitory machine-readable storage medium of claim 13, wherein the video image comprises a face, and wherein the image alteration comprises a zoomed-in image of the face that provides an enhanced resolution of the face.

18. A method comprising:

receiving, by a processing system including a processor, a video stream comprising a plurality of frames;

identifying, by the processing system, a plurality of faces in the video stream responsive to receiving a selection of the plurality of faces during a presentation of the video stream;

identifying a video image in the video stream responsive to receiving the selection of the plurality of faces during the presentation of the video stream, wherein the identifying of the video image is based on matching an image name in metadata of the video stream with a name of an image identification accessed from a database, and wherein the image identification identifies a portion of a frame included in the plurality of frames of the video stream associating the image identification and a plurality of alterations with the plurality of faces to generate a personalization policy, the associating being responsive to detecting user input indicating the plurality of alterations;

generating, by the processing system, a plurality of altered images, the plurality of altered images including a plurality of zoomed-in images of the plurality of faces based on the personalization policy; and producing, by the processing system, an adjusted video stream, the adjusted video stream including the plurality of altered images overlaying a portion of the plurality of frames, wherein a first position of content included in a first frame of the plurality of frames of the video stream is shifted so as to be located at a second position in the first frame of the plurality of frames of the adjusted video stream, and wherein the second position is different from the first position.

19. The method of claim 18, wherein the producing of the adjusted video stream further comprises transcoding the adjusted video stream.

20. The method of claim 18, wherein the producing of the adjusted video stream further comprises tagging a face included in the plurality of faces in the video stream as a tagged instance.

21. The method of claim 20, wherein the producing of the adjusted video stream further comprises transcoding the adjusted video stream in response to the tagged instance.

22. The method of claim 18, wherein the plurality of zoomed-in images of the plurality of faces provides an enhanced resolution of the plurality of faces.

* * * * *